United States Patent [19]

Drewery et al.

[11] Patent Number: 4,897,716

[45] Date of Patent: Jan. 30, 1990

[54] METHOD AND APPARATUS FOR ADAPTIVELY DISPLAYING VIDEO SIGNALS

[75] Inventors: John O. Drewery, Sutton; Arthur H. Jones, Horsham, both of United Kingdom

[73] Assignee: British Broadcasting Corporation, London, England

[21] Appl. No.: 227,906

[22] PCT Filed: Dec. 2, 1987

[86] PCT No.: PCT/GB87/00868

§ 371 Date: Aug. 1, 1988

§ 102(e) Date: Aug. 1, 1988

[87] PCT Pub. No.: WO88/04505

PCT Pub. Date: Jun. 16, 1988

[30] Foreign Application Priority Data

Dec. 2, 1986 [GB] United Kingdom ............... 8628813

[51] Int. Cl.⁴ .................................................. H04N 7/01
[52] U.S. Cl. ........................................ 358/105; 359/140; 359/167
[58] Field of Search ................ 358/105, 140, 160, 167, 358/11, 12, 183

[56] References Cited

U.S. PATENT DOCUMENTS

| | | | |
|---|---|---|---|
| 4,057,835 | 11/1977 | Kinuhata et al. | 358/140 |
| 4,635,114 | 1/1987 | Wendland et al. | 358/105 X |
| 4,731,648 | 3/1988 | Bernard et al. | 358/105 |
| 4,731,651 | 3/1988 | Matsumoto et a. | 358/105 X |
| 4,745,458 | 5/1988 | Hirano et al. | 358/11 |
| 4,785,351 | 11/1988 | Ishikawa | 358/105 X |

FOREIGN PATENT DOCUMENTS

| | | |
|---|---|---|
| 3444836 | 6/1986 | Fed. Rep. of Germany . |
| 0213186 | 10/1985 | Japan .................... 358/12 |
| 83/00968 | 3/1983 | PCT Int'l Appl. . |
| 2092858 | 8/1982 | United Kingdom . |

*Primary Examiner*—Tommy P. Chin
*Assistant Examiner*—Victor R. Kostak
*Attorney, Agent, or Firm*—Robert F. O'Connell

[57] ABSTRACT

A video display device has a scanning standard which is instantaneously adaptively dependent on the presence of movement in the picture. With a 625/50/2:1 input signal, in the absence of motion the standard used is 625/100/2:1. In the presence of motion the standard can remain 625/50/2:1. The video input is applied to a line store (108) and through an attenuator (102) to field stores (104). An appropriate one of the store outputs is selected by a switch (12) in dependence on a movement signal (116). In a preferred alternative, in the presence of motion the standard is altered to 625/50/1:1.

7 Claims, 11 Drawing Sheets

STATIONARY

MOTION

METHOD AND APPARATUS FOR ADAPTIVELY DISPLAYING VIDEO SIGNALS

BACKGROUND OF THE INVENTION

This invention relates to a method of and apparatus for the display of conventional video signals at high field rate without complex pre-processing.

Conventional television systems, particularly those based on a field rate of 50 Hz, tend to suffer from flicker in large bright areas of the picture. Such flicker can be especially noticeable on large area displays, when it is perceived by the viewer's peripheral vision. Large area flicker can be reduced by increasing the field rate at the display; one simple method of achieving this would be to display each picture at twice the normal rate. This requires the use of a system of storage into which incoming signals are written and from which they are read twice over at twice the conventional scanning frequency. This simple method would remove large area flicker but would also provoke an annoying judder on moving objects, whose edges and fine detail would be portrayed as having discontinuous movement.

However, the display of moving parts of the picture in accordance with conventional scanning standards does not give rise to appreciable judder, assuming that the original scene was similarly scanned, e.g. in a conventional television camera. Moreover, the presence of movement will tend to prevent the perception of large area flicker.

SUMMARY OF THE INVENTION

We have appreciated that large area flicker might be removed without incurring the penalty of movement judder if moving areas of the picture are displayed conventionally, e.g. at the 625/50/2:1 standard, while stationary areas are displayed at a higher field rate, e.g. at 625/100/2:1.

With this arrangement the two types of area have differing numbers of lines per unit time, giving rise to differing displayed intensities. In a second embodiment of the invention this is overcome by displaying moving areas with a 625/50/1:1 standard.

All these figures are those appropriate to a 625 line 50 field per second based system by means of which it is convenient to illustrate the invention but the invention is not limited thereto.

The invention is more particularly defined in the appended claims.

BRIEF DESCRIPTION OF THE DRAWINGS

The invention will be described by way of example with reference to the drawings in which.

DETAILED DESCRIPTION OF THE PREFERRED EMBODIMENTS

We have appreciated that to implement a display based on the above concept successfully, it may be necessary to provide a number of facilities and solve a number of problems. These may be listed as follows:

(a) It is necessary to distinguish between stationary and moving areas in the picture. A number of methods of doing this have been proposed. A full description of movement would require the generation of complex motion vectors, and to make full use of the information thus derived, would itself demand quite complex processing. For the display technique envisaged here, however, it may be sufficient to know which areas of the picture are moving and which are stationary; this information can be much more simply derived. As will be shown later, some information about the speed of movement may also be helpful, but it is not necessary to know in which direction the movement is taking place.

If a system of Digitally Assisted Television (DATV) is used, movement information may already have been generated and be present as part of the incoming signal.

(b) It is necessary to decide upon the minimum size of the areas designated as stationary or moving. To avoid any noticeable effects at the boundaries between stationary and moving areas, it may be necessary to arrange some form of crossfade action in the processing used to prepare the signal for display.

Figure 1:
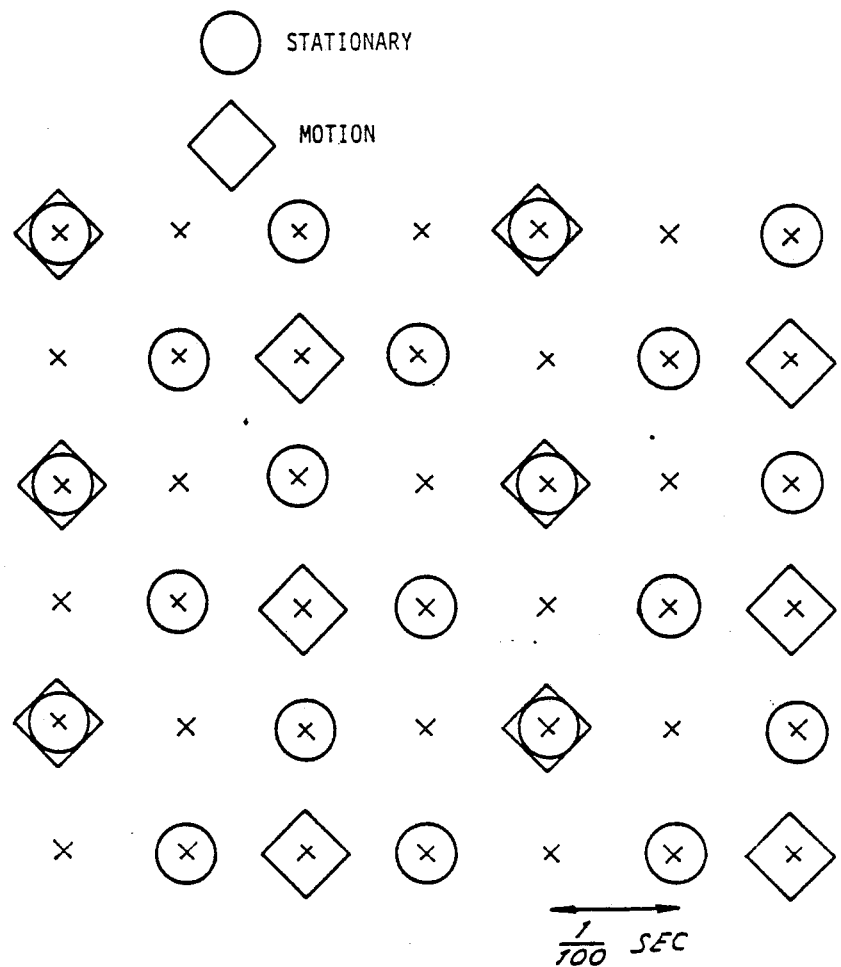
FIG. 1 is a vertical/temporal diagram showing possible positions of scanned lines and those displayed in areas of motion and in stationary areas.

(c) The display standard envisaged is based on 625/100/1:1, i.e. the line frequency is four times the conventional value. Thus, for moving areas, the signal is applied to one half of the display lines. This is illustrated in FIG. 1, which is a vertical temporal diagram, and in which the crosses show the possible positions of the display lines, the circles indicate those used for the display of stationary areas, and the diamonds indicate those used for the display of moving areas, the latter corresponding to conventional scanning lines.

(d) Since those parts of the picture that are stationary are presented at display twice as frequently as those that are moving, the signal describing stationary areas needs to be reduced in level, so that the perceived brightness remains as for moving areas.

(e) In case there should be any movement of or within areas designated "stationary", it may be necessary to delay those parts of the signal that correspond to "moving" areas so as to equalise the mean display epoch of the two, and thus avoid any apparent "dissociation" of fine detail. Thus it will be observed that to achieve the display of stationary areas according to FIG. 1 will involve a minimum average delay in the incoming signal of 1/50 sec. A comparable delay in the information corresponding to moving areas would involve an interpolation process in which "odd" fields are derived from "even", and vice versa.

(f) To avoid any perceptible change in the portrayal of the scene at the beginning or end of slow movement, it may be necessary to effect a crossfade between the two modes of presentation, depending on the speed of movement. Such a crossfade could be effected within the same unit envisaged in (b).

Figure 2:
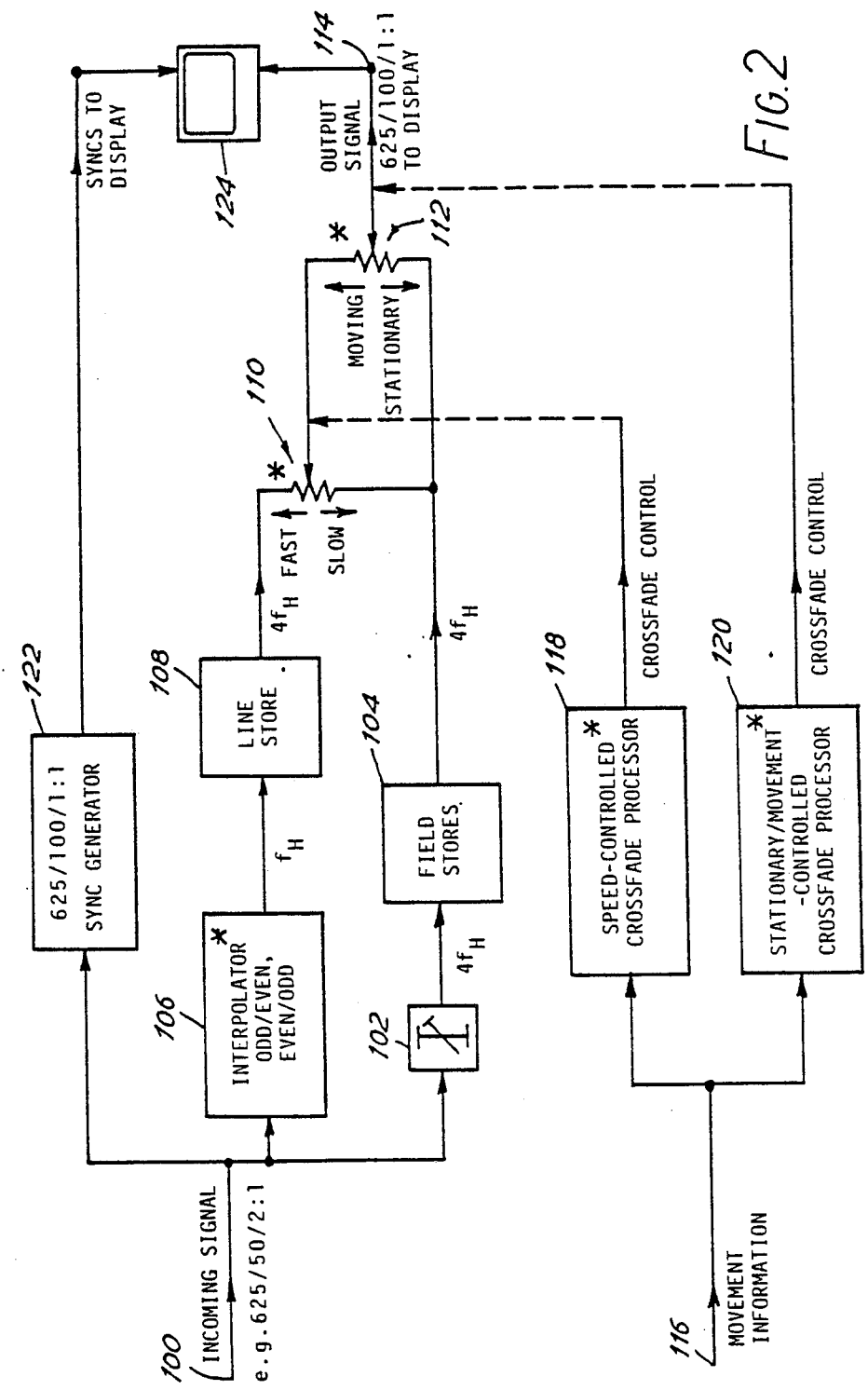
FIG. 2 is a schematic block diagram of a video display device operating in accordance with the principles of FIG. 1 and embodying the invention.

A block diagram incorporating, in basic form, the features described above is given in FIG. 2. The circuit of FIG. 2 has an input 100 for receiving a conventional incoming signal at the 625/50/2:1 standard. This signal is applied through an attenuator 102 to field stores 104 and also through an interpolator 106 to a line store 108. The outputs of the line and field stores 108,104 are connected across a cross-fader 110 which moves between fast and slow extremities and the output of field stores 104 and cross-fader 110 are connected across a cross-fader 112 which moves between moving and stationary extremities. The top of cross-fader 112 constitutes the output signal 114 for display.

The cross-faders 110 and 112 are controlled from movement information determined in known manner and received at an input 116. A processor 118 determines the speed of movement to provide a control signal for cross-fader 110. A processor 120 determines whether the picture area represents stationary or moving information to provide a control signal for cross-fader 112. Alternatively cross-faders and associated processors can be replaced by selector switches and appropriate control circuits, or circuits 110, 118 can be omitted altogether.

A synchronising signal generator 122 generates appropriate sync. pulses for application to a display 124.

Figure 3:
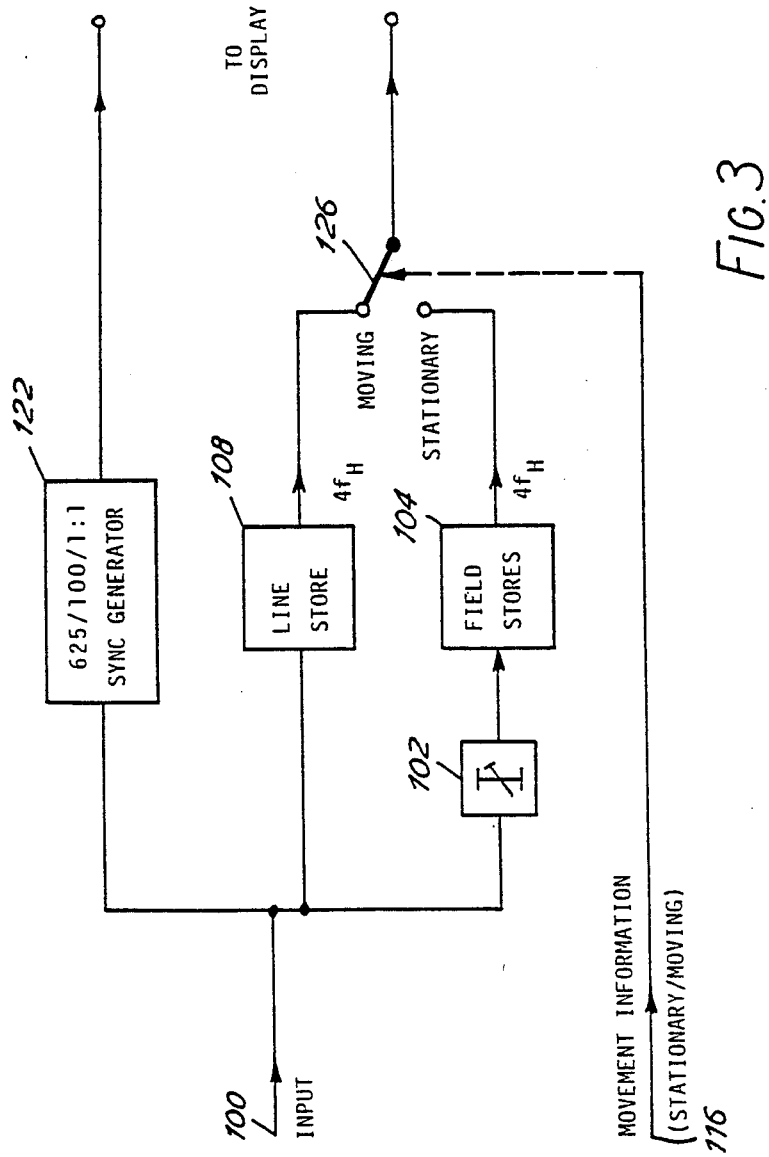
FIG. 3 is a simplified version of the circuit diagram of FIG. 2.

It may be possible to omit some of the circuits marked with an asterisk. If it should happen that none of them is required, then the arrangement can be considerably simplified, as shown in FIG. 3. Cross-fader 112 is replaced by selector switch 126.

The circuits illustrated can drive a high field rate display so as to reduce or avoid the large area flicker problems produced by conventional television signals without at the same time incurring problems with movement. The method can be extended by appropriate vertical interpolation to provide for an increase in the number of lines displayed. The techniques described could in principle be applied to other forms of display in which raster scanning is not used. More sophisticated techniques can be considered to overcome spatial or temporal discontinuities in the picture.

Thus as described above the apparatus illustrated is capable of adapting between 625/100/2:1 and 625/50/2:1 scanning structures in order to present flicker-free display without incurring objectionable effects on moving objects. The first structure is used where there is no motion and the second where motion exists. Such an adaptation requires the display to scan with a structure which contains all the lines and fields of both structures and is thus a 625/100/1:1 structure. The required behaviour is then obtained by selectively blanking lines in this "super-structure". In practice, it would be necessary to effect a gradual cross-fade between the two structures to avoid undesirable effects caused by switching between the two modes.

One problem, mentioned at (d) above, is that, as the two structures have differing numbers of lines per unit time, the first structure gives a brighter display than the second and so this must be compensated. Such compensation is difficult to achieve accurately because conventional display devices are highly nonlinear, i.e. they do not have a linear relationship between applied signal and brightness.

In an improved arrangement this problem of differential brightness is overcome by postulating a different scanning structure for the motion mode, having the same number of lines per unit time as the first structure. This is a 625/50/1:1 structure.

Figure 4:
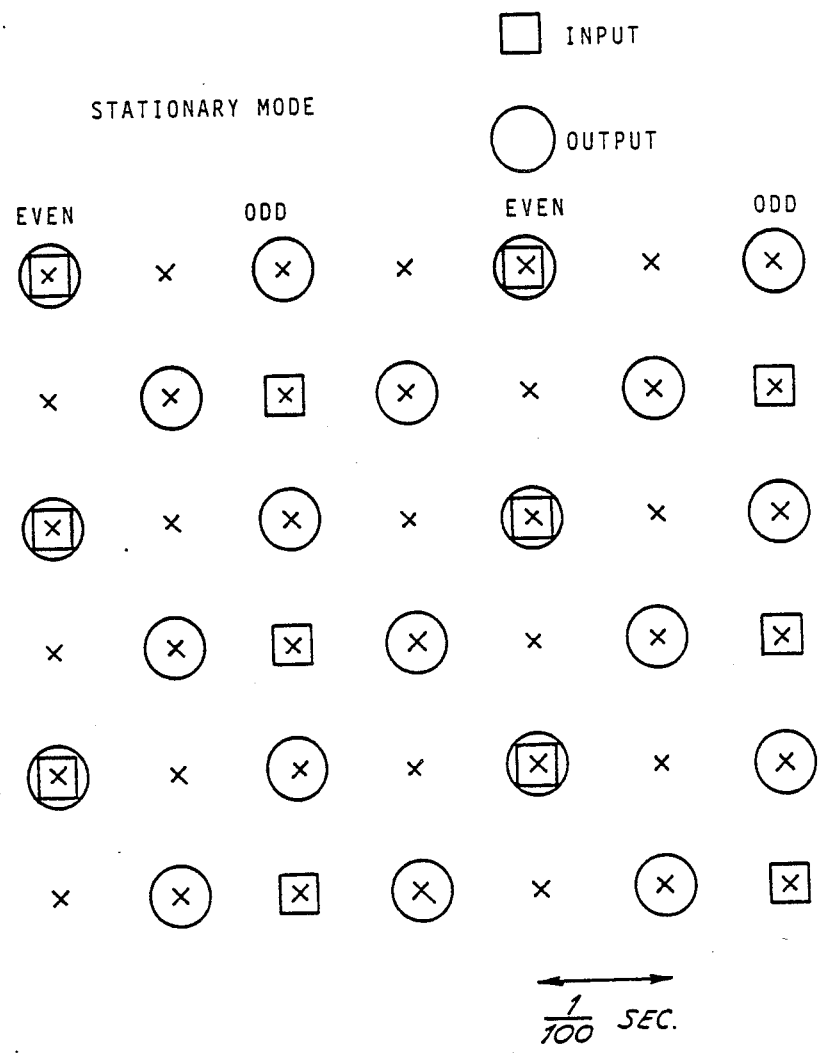
FIGS. 4 and 5 are vertical/temporal diagrams similar to FIG. 1 showing lines displayed in the stationary mode and in the motion mode respectively in a second embodiment of the invention.
Figure 5:
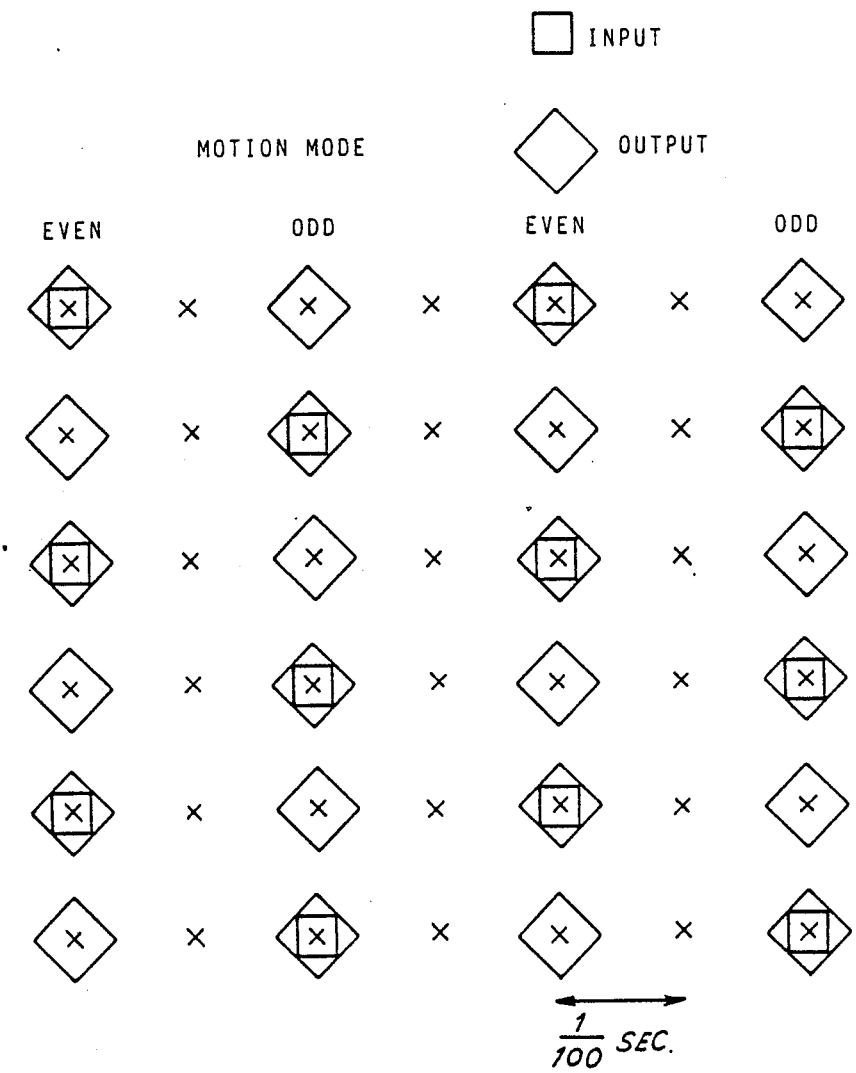

FIGS. 4 and 5 show the structure of the 625/100/1:1 "super-structure" marked by X's on which is superimposed the structure of the incoming 625/50/2:1 signal, marked by squares. In FIG. 4 is also shown the position of the output 625/100/2:1 "stationary mode" structure, marked by circles. The input field in which output lines coincide have arbitrarily been designated EVEN, the others ODD. In FIG. 5 is shown the position of the output 625/50/1:1 "motion mode" structure, marked by diamonds. It can be seen that the difference between the output fields in the two modes lies in a shift of time of alternate lines by one output field period. It is this time shift which converts a 625/100/2:1 structure into a 625/50/1:1 structure and dictates the need for temporal interpolation to ensure that the epoch of the two structures is the same, as mentioned in (e) above.

Figure 6:
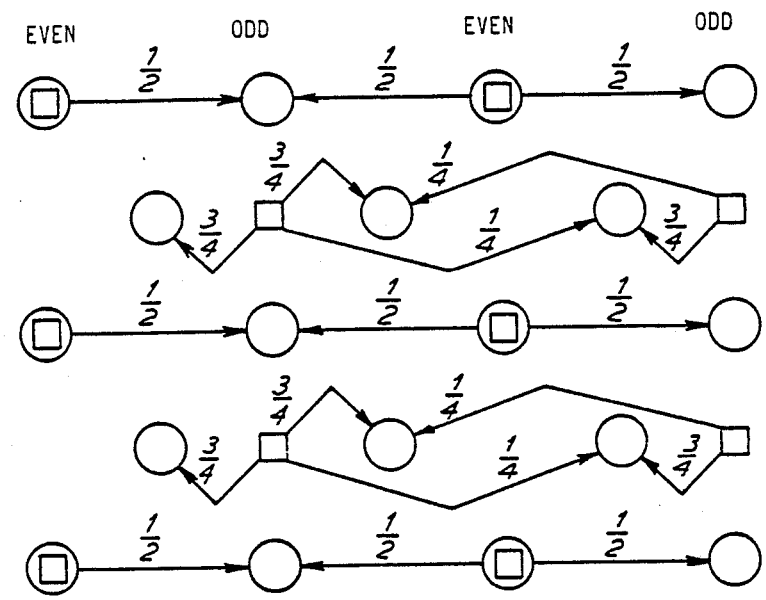
FIGS. 6 and 7 illustrate simple algorithms for generating the content of the output lines shown in the stationary and motion modes respectively as defined by FIGS. 4 and 5.
Figure 7:
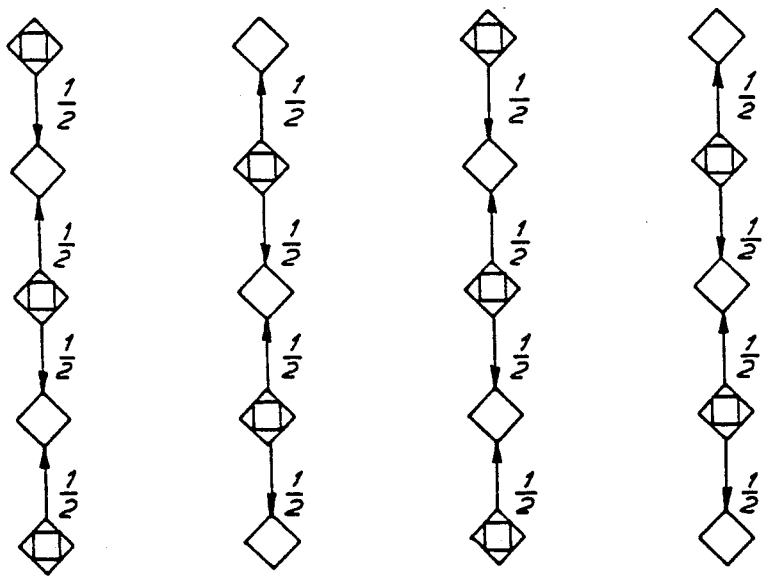

FIGS. 6 and 7 show a simple example of algorithms necessary to ensure that the spatial and temporal epochs of the two structures are the same. More complicated algorithms could be used but those shown are simple for the purpose of clarity. From these diagrams it can be deduced that in order to make successive output fields the sequence of input fields required is:

1,3/2,4/3/2,4/3,5/4,6/5/4,6/5,7/6,8/7 etc.

in the stationary mode and:

2/-/3/-/4/-/5/-/6/-/7/etc.

in the motion mode.

Figure 8:
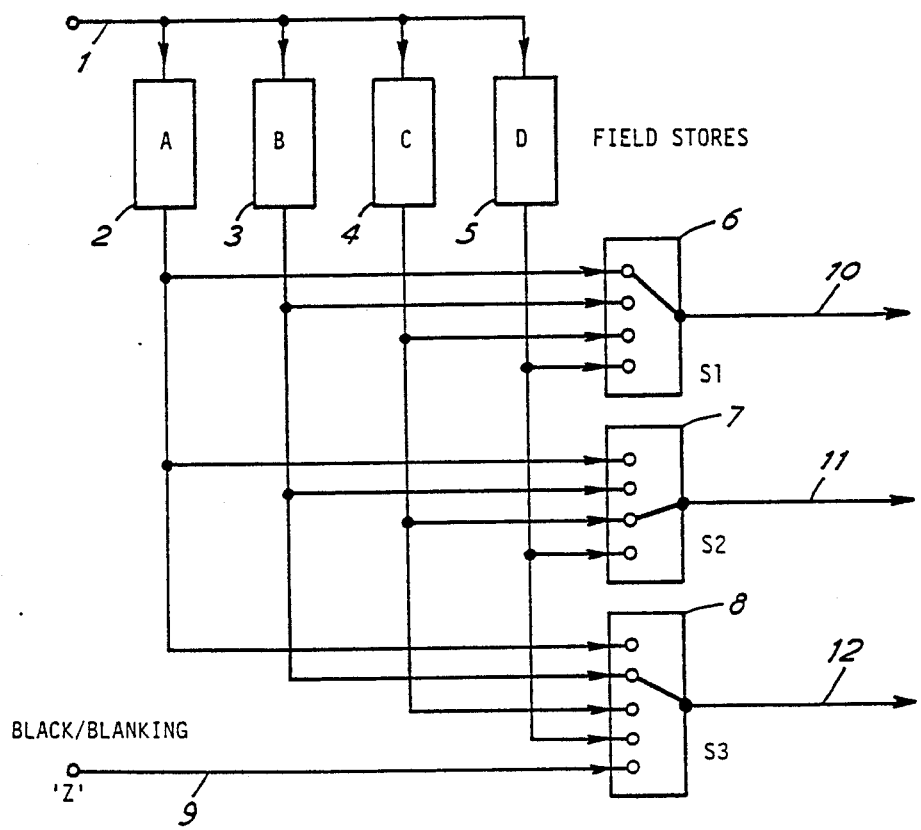
FIG. 8 illustrates an arrangement of field stores for providing access to the signals for the algorithms of FIGS. 6 and 7.

FIGS. 8 to 14 describe a second embodiment of the invention making use of this principle. In this embodiment the required field access pattern is achieved by writing the incoming signal into four field stores A,B,C,D as shown in FIG. 8 which provide appropriate scan conversion means. Conventional-standard signals are input over a line 1 which is connected to the four field stores 2, 3, 4 and 5. The outputs of these four stores are taken to three notional switches S1, S2 and S3, 6, 7 and 8. These switches are notional in that their function would in practice be carried out by connecting the stores to common buses and enabling the store outputs. However, the switches are useful conceptually for the purpose of explanation. S1 and S2 are four-way switches, each input taking one store output, and S3 is a five-way switch, the fifth input being a feed of black or blanking level, input over a line 9. The switches S1 to S3 produce signals output over lines 10, 11 and 12 respectively.

Figure 9:
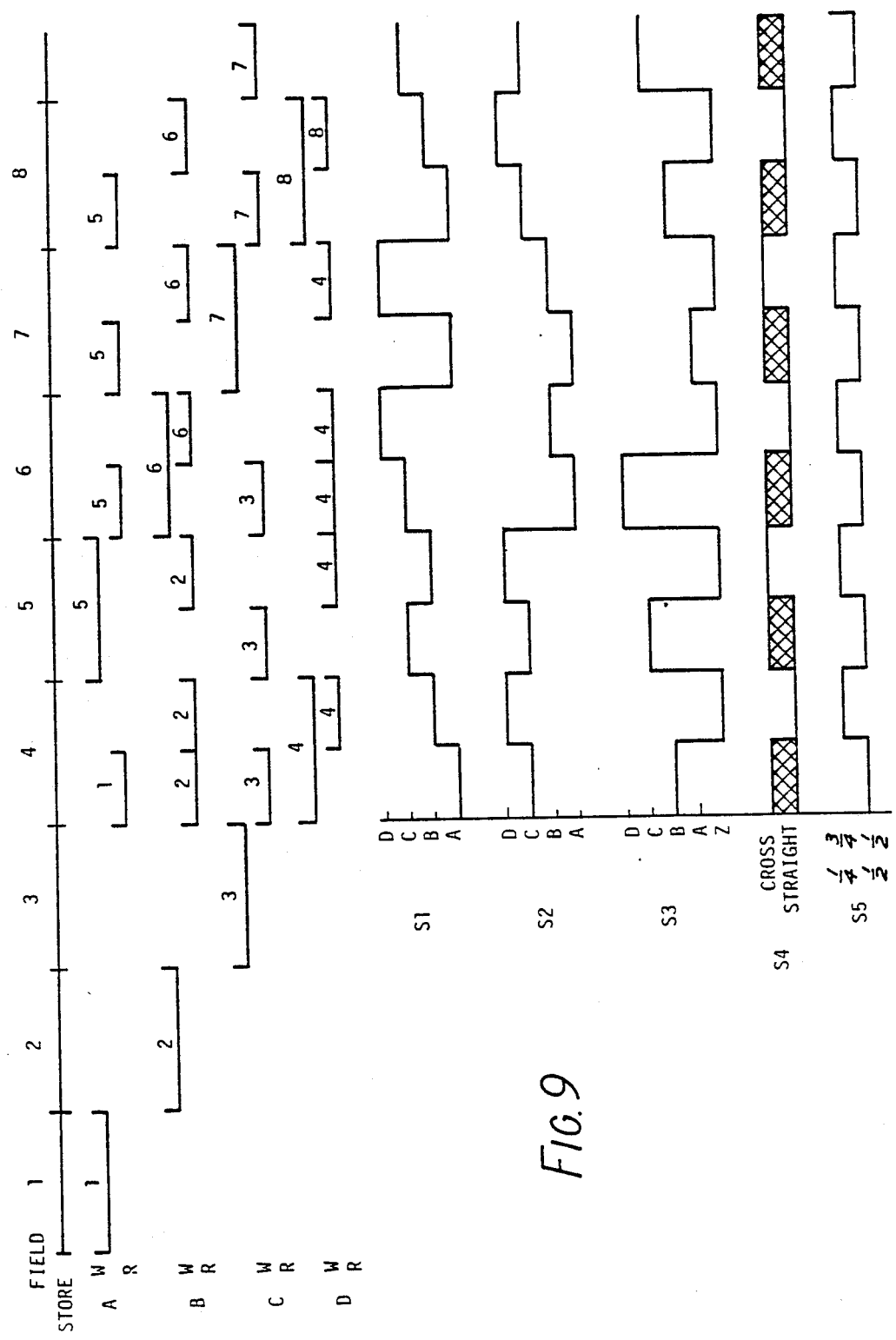
FIG. 9 illustrates the timing of the field store cycles and the operation of the switches S1 to S5 in the circuit of FIG. 8.

FIG. 9 shows the timing of the store write and read cycles together with the operation of switches S1 to S3. Incoming fields are written cyclically into the stores and read at twice the rate either three or four times at appropriate intervals. Switches S1 and S2 operate so as to produce signals needed for the "stationary mode" temporal interpolator whilst S3 operates so as to produce a signal appropriate for the "motion mode" spatial interpolator. Note that at every fourth field the state of S1 and S2 are identical whilst S3 must switch to a fifth state representing black or blanking level on every other output field.

Figure 10:
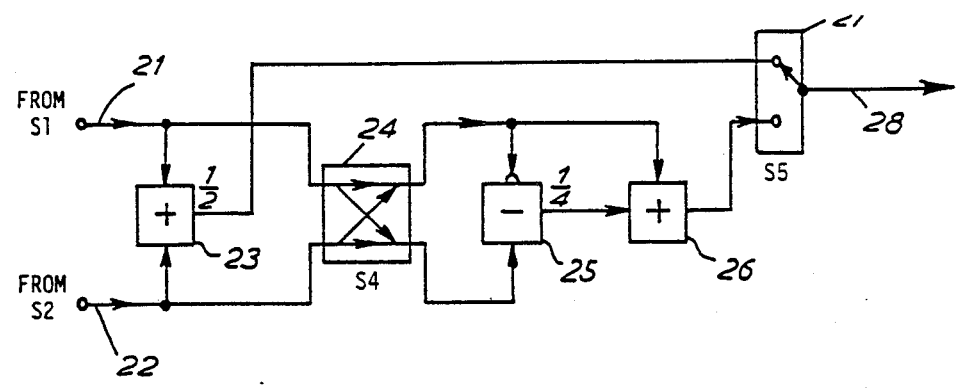
FIG. 10 is a circuit diagram of the temporal interpolator used in the second embodiment.
Figure 11:
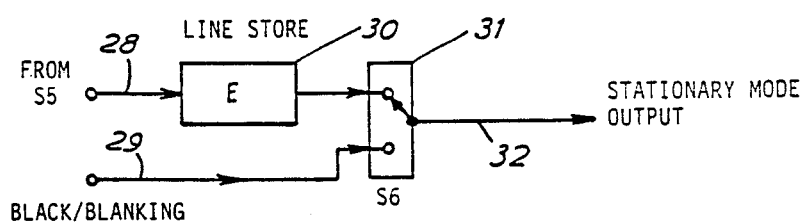
FIG. 11 is a circuit diagram of the time re-distributor used in association with the circuit of FIG. 10.

FIG. 10 shows the temporal interpolator. Signals from S1 and S2, input over lines 21 and 22 are fed to a halving adder 23 whose output is fed to one input of switch S5 27. The same signals are also fed to a crossover switch S4 24 and thence to a quartering subtractor 25 and adder 26 whose output is fed to the other input of switch S5. The switch produces an output over a line 28. FIG. 6 shows that there are four kinds of output fields with weighting coefficients (1,0), (1/4,3/4), (1/2,1/2) and (3/4,1/4). The first and third kinds are produced by the halving adder and the other kinds by the quartering subtractor and adder in conjunction with the crossover switch S4. Switch S5 operates at double the incoming field rate so as to select appropriate kinds. The timing of the operation of S4 and S5 are shown in FIG. 9. Finally, the signal from S5 must be time-compressed by a factor of 2 and interspersed with lines of black level to provide a signal appropriate to the 625/100/1:1 display standard. As shown in FIG. 11, this is achieved by writing the signal to a line store and reading from it at twice the rate. The signal from S5 on line 28 is fed to a line store E, 30 whose output is fed to one input of a switch S6 31. The other input is fed with black level input over a line 29. Switch S6 operates so as to select alternate inputs for half the line period of the signal on line 28 and produces an output over a line 32.

Figure 12:
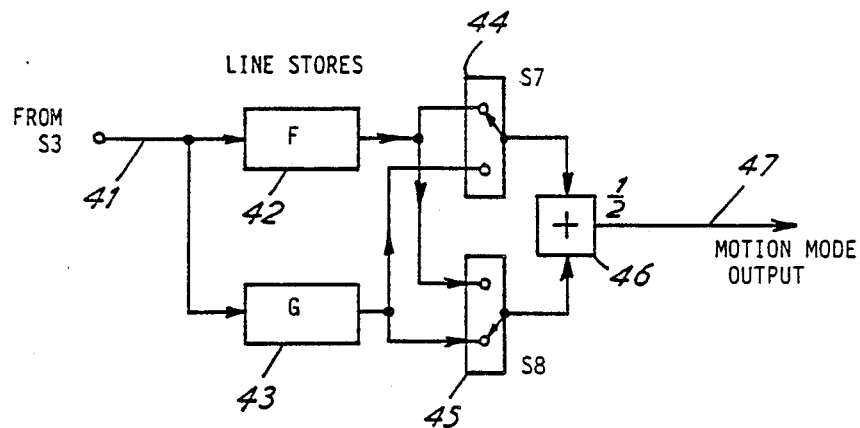
FIG. 12 is a circuit diagram of the spatial interpolator and tiem re-distributor of the second embodiment.

FIG. 12 shows the spatial interpolator. This must accept incoming lines and provide alternate direct and interpolated lines at twice the incoming rate. The signal from S3, input over a line 41, is fed to two line stores F and G, 42 and 43, whose outputs are fed to two two-way switches S7 and S8, 44 and 45. The outputs of switches S7 and S8 are fed to a halving adder 46 which produces a signal over line 47.

Figure 14:
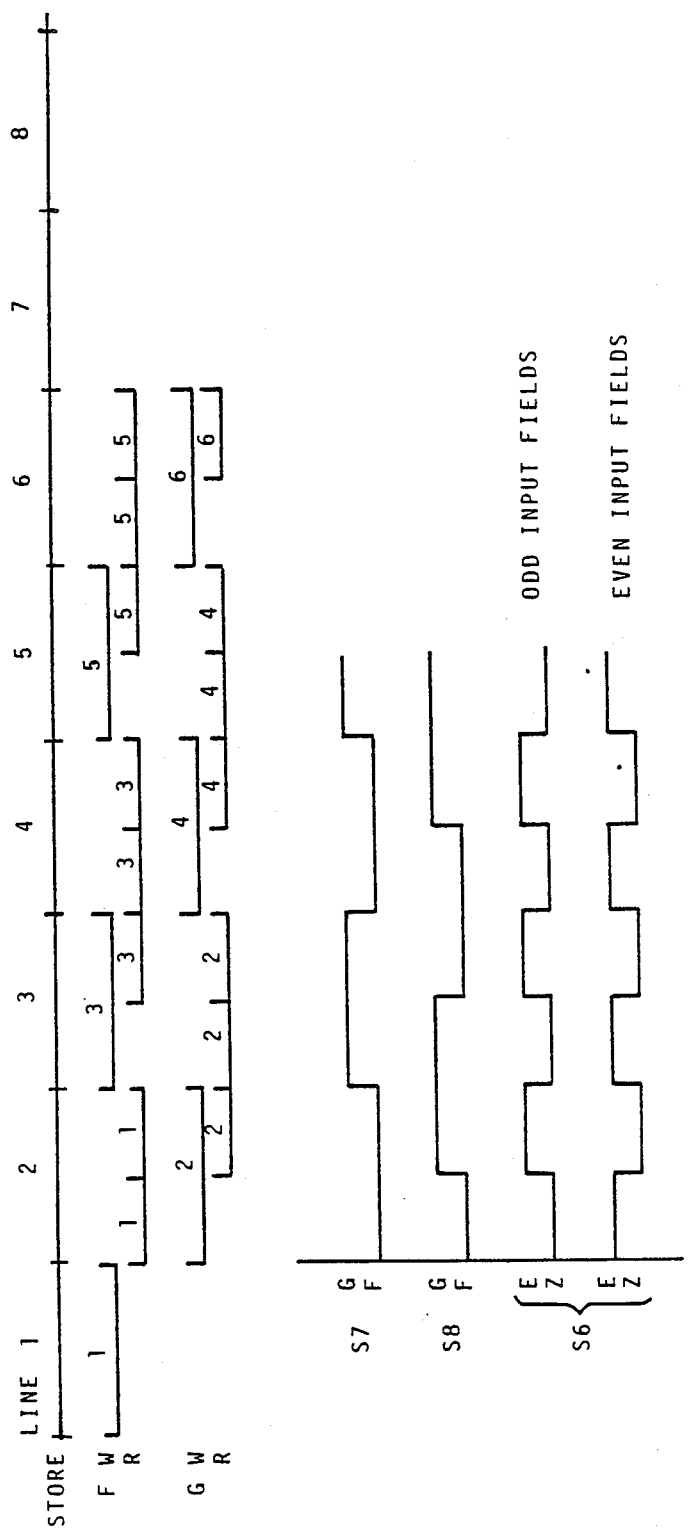
FIG. 14 is a timing diagram illustrating the timing of line store cycles and the operation of switches S6 to S8.

The timing of the line store cycles and switches S7 and S8 are shown in FIG. 14. Input lines are written alternately into the two stores and read at twice the rate three times at appropriate intervals so as to produce either one or two signals. Note that the operation of switches S7 and S8 is such that their outputs are identical every other output line thereby providing uninterpolated lines.

The operation of switch S6 in the temporal interpolator must be synchronous with that of S7 and S8 so as to provide a signal of the appropriate apoch, suitable for cross-fading. On ODD input fields FIGS. 4 and 5 show that temporally interpolated "stationary mode" lines are produced at the same time as spatially interpolated "motion mode" lines whereas non-interpolated "motion-mode" lines are produced at the same time as blank "stationary mode" lines. Thus, S6 must switch to store E when S7 and S8 are switched to differing F and G stores. On EVEN input fields the reverse situation obtains. There are thus two alternative phases for the operation of switch S6 in relation to switches S7 and S8 as shown in FIG. 14. This requires an adjustment of the relative phase between the signals entering the spatial and temporal interpolators by one output line period every other input field. This can easily be accommodated by adjusting the reading of stores A, B, C and D.

Figure 13:
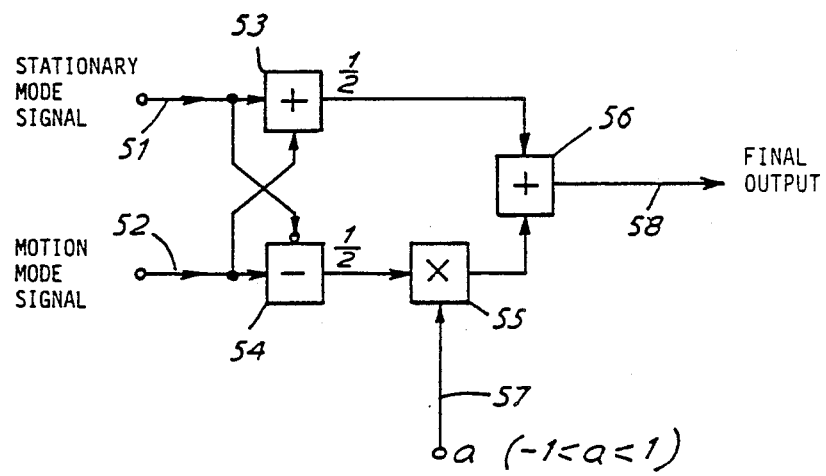
FIG. 13 is a circuit diagram of a possible form of cross-fader circuit.

Finally, as mentioned above, it is desirable to effect a crossfade between temporally and spatially interpolated signals dependent on a motion signal. Assuming such a signal is available, excursing over a range −1 to +1, a circuit for performing such a cross-fade is shown in FIG. 13. Inputs from the temporal and spatial interpolators, input over lines 51 and 52, are fed to a halving adder 53 and a halving subtractor 54. The output of the subtractor 54 is fed to a multiplier 55 which is also fed with a motion signal input, 'a', over a line 57. The outputs of the multiplier and halving adder are fed to an adder 56 which produces a cross-faded signal over a line 58. This signal varies from pure stationary to pure motion signals as 'a' varies from −1 to +1 and is then suitable for feeding to a display having a scanning standard of 625/100/1:1.

Although the principle and embodiment have been described in terms of a conventional 625/50/2:1 standard broadcast television signal it will readily be apparent that they are equally applicable to the display of a conventional 525/60/2:1 signal or, indeed, any 2:1 interlaced signal having a field rate which is deemed inadequate for the suppression of flicker.

We claim:
1. A video display device comprising
a first input means for receiving a first video signal representing an image and having a first scanning standard;
a second input means for receiving a movement signal containing information as to whether designated areas of the image being represented by the first video signal contain stationary or moving information;
means for deriving from the first video signal a second video signal having a second scanning standard;
display means operable at the second scanning standard;
means for applying the second video signal to the display means; and
means for selectively blanking lines in the second video signal applied to the display means in each designated area of the image being represented in dependence upon the received movement signal.

2. A video display device according to claim 1, in which the first video signal has N fields per second with a 2:1 interlace, and the second video signal has 2N fields per second without interlace, and in which, in the absence of movement, lines in the second video signal are blanked such as to apply the signal to the display at 2N fields per second with interlace.

3. A video display device according to claim 2 in which in the presence of movement lines in the second video signal are blanked so as to apply the signal to the display at N fields per second without interlace.

4. A video display device according to claim 2 in which in the presence of movement lines in the second video signal are blanked so as to apply the signal to the display at N fields per second without interlace.

5. A video display device comprising:
a first input means for receiving a first video signal representing an image and having a first scanning standard;
a second input means for receiving a movement signal containing information as to whether designated areas of the image being represented by the first video signal containing stationary or moving information;

a plurality of field store means coupled to the first input means and having a plurality of outputs;

interpolation means selectably coupled to the outputs of the field store means for providing a spatially interpolated video signal for display in moving areas of the image and a temporally interpolated video signal for display in stationary areas of the image, said spatially and temporally interpolated signals containing blanked lines of video information such that they may both be applied to display means operating at a second scanning standard.

6. A video display device according to claim 5 including means responsive to the rate of movement in the image to cause varying proportions of the temporally and spatially interpolated video signals to be applied to the display means.

7. A method for displaying a video signal comprising the steps of:

receiving a first video signal representing an image and having a first scanning standard;

receiving a movement signal containing information as to whether designated areas of the image being represented by the video signal contain stationary or moving information;

deriving from the first video signal a second video signal having a second scanning standard;

applying the second video signal to the display means; and selectively blanking lines of the second video signal in each designated area of the image in accordance with the received movement signal.

* * * * *